Figure 1:
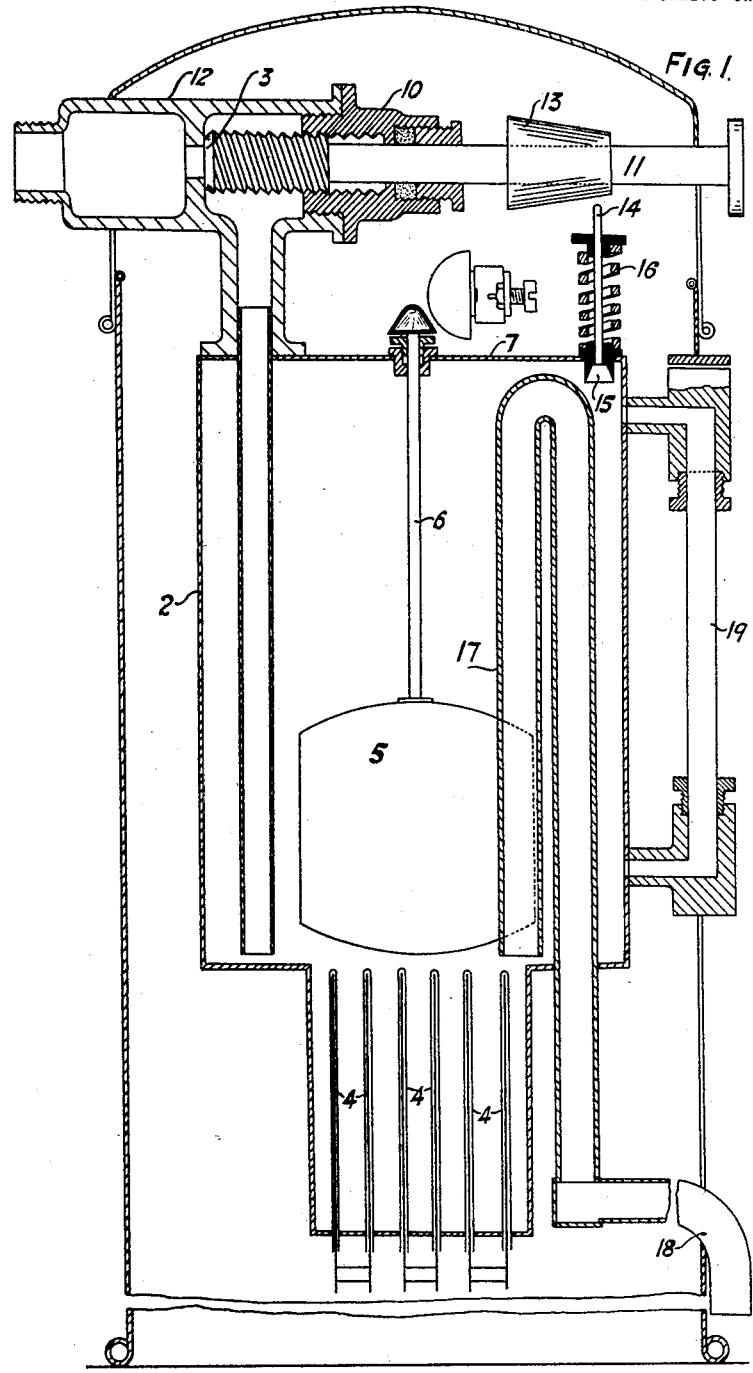

C. KRATT.
ELECTRIC WATER HEATER.
APPLICATION FILED JAN. 4, 1921.

1,394,847.

Patented Oct. 25, 1921.
2 SHEETS—SHEET 1.

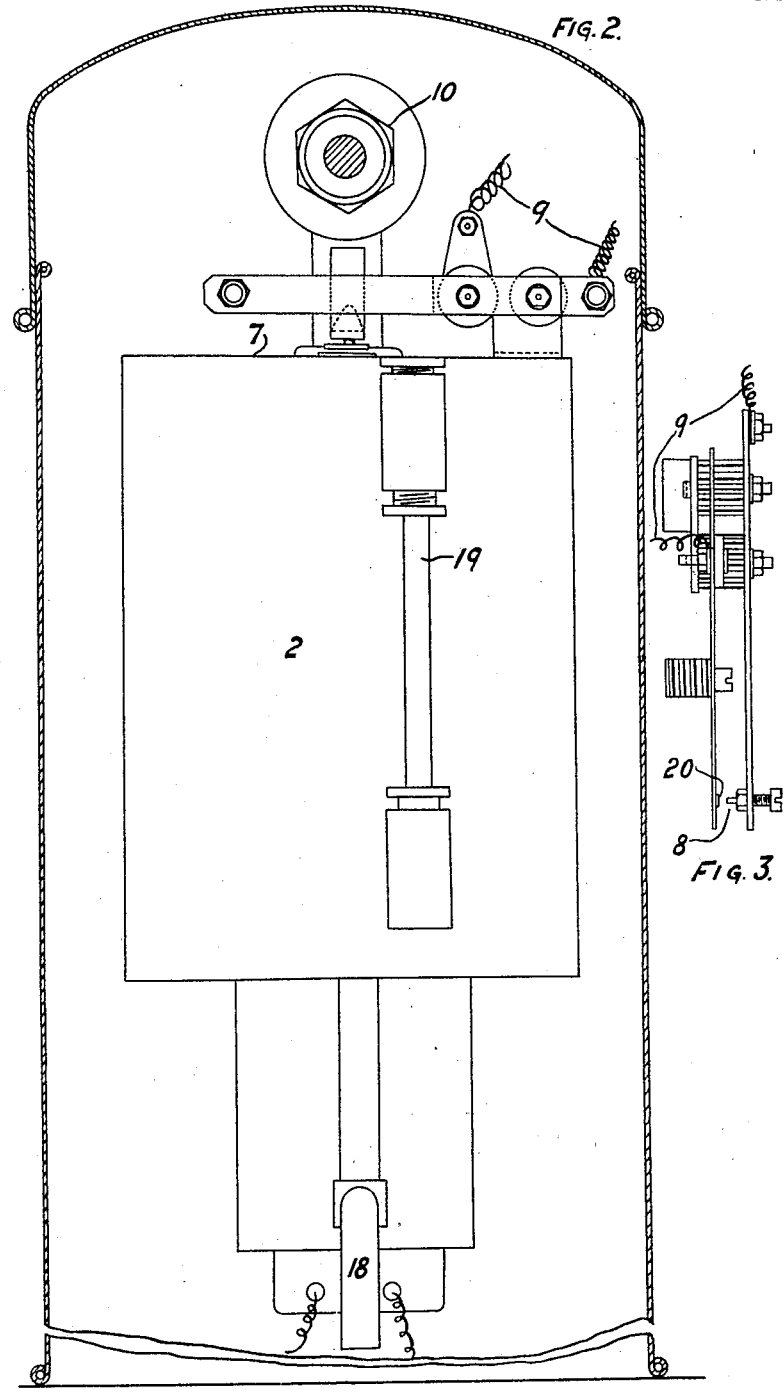

UNITED STATES PATENT OFFICE.

CHARLES KRATT, OF NOTTINGHAM, ENGLAND, ASSIGNOR TO FILBAR ELECTRIC HEATER, LIMITED.

ELECTRIC WATER-HEATER.

1,394,847.  Specification of Letters Patent.  Patented Oct. 25, 1921.

Application filed January 4, 1921. Serial No. 435,005.

*To all whom it may concern:*

Be it known that CHARLES KRATT, a subject of the King of the United Kingdom of Great Britain and Ireland, and resident of Nottingham, England, has invented a certain new and useful Improvement in and Relating to Electric Water-Heaters, (for which I filed an application in Great Britain, No. 21,885, on September 5th, 1919) of which the following is a specification.

This invention relates to electric water heaters, and has for its object to provide an improved construction of heater which can rapidly heat and deliver small quantities of boiling water at a time.

The invention is illustrated in the accompanying drawings in which Figure 1 is an elevation partly in section. Fig. 2 is an outside view at right angles to Fig. 1 with the casing in question. Fig. 3 is a fragmentary view showing the contact maker and shunt circuit connections.

In accordance with the invention, and as shown in the drawings, the heater includes a tank integral with a closed float chamber 2 to which the water is supplied by a valve 3, the electric heating elements 4 being disposed in the tank. The float 5 within the float chamber 2 carries an upwardly projecting rod 6 extending through the cover 7 of the tank and float chamber and adapted on rising to move into "on" position a switch 8 for a shunt circuit 9 controlling in suitable manner the switch of the main circuit (not shown) for supplying current to the heating elements 4.

The water supply valve is preferably of the screw down type, the body of the valve 3 being in screw-threaded engagement with the cover 10 of the valve casing 12.

A cam or the like 13 on the valve spindle 11 may be arranged to engage the spring pressed spindle 14 of a relief valve 15 fitted to the cover 7 of the tank 2 so that when the valve 3 is opened to admit water to the tank, the conical or other suitably shaped cam 13 on the valve spindle 11 will open the valve 15, thus allowing the air to escape from the tank when the tank is being filled with water. When the valve 3 is closed the cam 13 is disengaged from the spindle 14 and the valve 15 is closed by means of the spring 16. In lieu of providing a relief valve actuated by a cam we may provide a small hole in the siphon beyond the bend.

Within the tank 2 is arranged a siphon pipe 17 leading to the delivery pipe 18. A gage glass 19 is provided to indicate the level of the water in the tank.

To operate the heater, the water supply valve 3 is moved into "on" position, thereby also opening the valve 15, and is retained in this position until the desired quantity of water has passed into the tank, as shown by the gage glass. The valve 3 is then closed, allowing the valve 15 to close also. The float 5 rises as the tank is being filled and the rod 6 carried thereby moves the contact 20 of the switch 8 into "on" position, switching on the main current to the heating elements 4. The water is heated and very rapidly raised to boiling point. When boiling point is reached, the steam generated expels the boiling water through the siphon 17 and delivery pipe 18, and the float 5 falls to its original position, thereby allowing the contact 20 of the switch 8 to move into "off" position, thus switching off the main current.

The heater is now again ready for action.

I claim:

1. An electric heater for heating and causing the delivery of a hot liquid including a tank connected with a supply pipe for the said liquid, a valve adapted to control the supply of the said liquid, an electric heating means associated with the said tank, a float within the said tank, means associated with the said float and adapted to switch on and off the current to the said electric heating means when the said float is moved, and means associated with the said controlling valve for enabling the outlet of air from the tank when the said controlling valve is opened.

2. An electric heater for heating and causing the delivery of hot liquid including a tank having a supply pipe connected thereto, a valve located in the said supply pipe and adapted to control the supply of liquid, electric heating means associated with the said tank, a float within the said tank, means associated with the float for switching on and off the current to the said electric heating means when the said float is moved, a relief valve adapted to permit the escape of air from the tank when the liquid enters the same, and means associated with the said control valve and adapted to open the said relief valve when the said control valve is opened.

3. A heater for heating and causing the delivery of a hot liquid including a tank having a supply pipe associated therewith, a control valve having a stem and a cam member mounted on the said stem and adapted to control the supply of liquid to the said tank, electric heating means associated with the said tank, a float located within the said tank, means associated with the said float for switching on and off the current to the said electric heating means, and a relief valve adapted to permit the escape of air from the said tank, the stem of said relief valve and the said cam on the spindle of the control valve coöperating to open the relief valve when the control valve is opened.

In testimony whereof I have signed my name to this specification in the presence of two subscribing witnesses.

CHARLES KRATT.

Witnesses:
JOHN T. JENKINS,
M. M. MANSFIELD.